US012722155B2

(12) United States Patent
Ahitan et al.

(10) Patent No.: US 12,722,155 B2
(45) Date of Patent: Sep. 1, 2026

(54) MICROFLUIDIC DEVICES, MICROFLUIDIC SYSTEMS, AND METHODS FOR ASSESSING THERMOPHYSICAL PROPERTIES OF A FLUID

(71) Applicant: INTERFACE FLUIDICS LTD., Calgary (CA)

(72) Inventors: Sourabh Ahitan, Edmonton (CA); Ali Abedini, Edmonton (CA); Thomas De Haas, Edmonton (CA); Hongying Zhao, Richmond (CA)

(73) Assignee: INTERFACE FLUIDICS LTD., Edmonton (CA)

( * ) Notice: Subject to any disclaimer, the term of this patent is extended or adjusted under 35 U.S.C. 154(b) by 591 days.

(21) Appl. No.: 18/253,655

(22) PCT Filed: Dec. 14, 2021

(86) PCT No.: PCT/CA2021/051797

§ 371 (c)(1),
(2) Date: May 19, 2023

(87) PCT Pub. No.: WO2022/126252

PCT Pub. Date: Jun. 23, 2022

(65) Prior Publication Data

US 2024/0001365 A1 Jan. 4, 2024

Related U.S. Application Data

(60) Provisional application No. 63/127,206, filed on Dec. 18, 2020.

(51) Int. Cl.
*B01L 3/00* (2006.01)

(52) U.S. Cl.
CPC ... *B01L 3/502784* (2013.01); *B01L 3/502715* (2013.01); *B01L 2200/027* (2013.01); *B01L 2200/146* (2013.01); *B01L 2200/147* (2013.01)

(58) Field of Classification Search
CPC ......... B01L 3/502784; B01L 3/502715; B01L 2200/027; B01L 2200/146;
(Continued)

(56) References Cited

U.S. PATENT DOCUMENTS 4,455,860 A 6/1984 Cullick et al.
4,627,273 A 12/1986 Christiansen et al.
(Continued)

FOREIGN PATENT DOCUMENTS

EP 2252888 B1 10/2014
WO 2019067319 A3 5/2019
WO 2021253112 A1 12/2021

OTHER PUBLICATIONS

1—Phase Behaviour Fundamentals; Editor(s): Ali Danesh; Developments in Petroleum Science; Elsevier; vol. 47, 1998, pp. 1-31; ISSN 0376-7361; ISBN 9780444821966; https://doi.org/10.1016/S0376-7361(98)80023-X.(https://www.sciencedirect.com/science/article/pii/S037673619880023X).

(Continued)

*Primary Examiner* — Christine T Mui
(74) *Attorney, Agent, or Firm* — ABM INTELLECTUAL PROPERTY INC.; Adrienne Bieber McNeil

(57) ABSTRACT

A method for assessing thermophysical properties of a study fluid includes isolating a first a slug of a study fluid within an isolation fluid in a microfluidic channel; conducting a first optical investigation of the first slug to assess a thermophysical property of the first slug; while maintaining the first slug in the microfluidic channel and within the isolation fluid, modifying at least one of a pressure within the microfluidic channel and a temperature within the microfluidic channel; and conducting a second optical investigation of the first slug to re-assess the thermophysical property of the study fluid.

5 Claims, 8 Drawing Sheets

(58) Field of Classification Search

CPC ....... B01L 2200/147; B01L 2200/0673; B01L 2300/0816; B01L 2300/0887; B01L 2300/14; B01L 2400/086; G01N 33/2823

USPC .................................................. 422/504, 500

See application file for complete search history.

(56) References Cited

U.S. PATENT DOCUMENTS

| | | | | |
|---|---|---|---|---|
| 4,678,036 | A | 7/1987 | Hartman et al. | |
| 5,505,074 | A | 4/1996 | Mihcakan et al. | |
| 8,340,913 | B2 | 12/2012 | Mostowfi et al. | |
| 8,380,446 | B2 | 2/2013 | Mostowfi et al. | |
| 8,389,272 | B2 | 3/2013 | Linder et al. | |
| 8,485,026 | B2 | 7/2013 | Mostowfi | |
| 8,709,152 | B2 | 4/2014 | Hansen et al. | |
| 9,410,935 | B2 | 8/2016 | Olivos et al. | |
| 9,689,858 | B2 | 6/2017 | Ratulowski et al. | |
| 9,752,430 | B2 | 9/2017 | Mostowfi et al. | |
| 10,001,435 | B1 | 6/2018 | Sinton et al. | |
| 10,317,557 | B2 | 6/2019 | Gonzalez et al. | |
| 10,895,544 | B2 | 1/2021 | Molla et al. | |
| 11,015,434 | B2 | 5/2021 | Molla et al. | |
| 2007/0068573 | A1 | 3/2007 | Cox et al. | |
| 2008/0173076 | A1 | 7/2008 | Robin | |
| 2010/0017135 | A1 | 1/2010 | Mostowfi | |
| 2011/0030466 | A1 | 2/2011 | Mostowfi | |
| 2011/0307186 | A1 | 12/2011 | Mostowfi et al. | |
| 2011/0315229 | A1 * | 12/2011 | Linder .................. | B01L 3/0293 137/1 |
| 2013/0100453 | A1 | 4/2013 | Harrison et al. | |
| 2014/0123728 | A1 | 5/2014 | Mostowfi et al. | |
| 2014/0238122 | A1 | 8/2014 | Mostowfi et al. | |
| 2015/0096385 | A1 | 4/2015 | Downie et al. | |
| 2016/0011328 | A1 | 1/2016 | Jones et al. | |
| 2016/0047226 | A1 | 2/2016 | Hawthorne et al. | |
| 2016/0097757 | A1 | 4/2016 | Sieben et al. | |
| 2016/0115787 | A1 | 4/2016 | Mostowfi et al. | |
| 2016/0208601 | A1 | 7/2016 | Molla et al. | |
| 2016/0299047 | A1 | 10/2016 | Molla et al. | |
| 2017/0082551 | A1 | 3/2017 | MacKay et al. | |
| 2017/0225161 | A1 | 8/2017 | Begolo et al. | |
| 2017/0227479 | A1 | 8/2017 | Molla et al. | |
| 2018/0221867 | A1 | 8/2018 | Molla et al. | |
| 2018/0313213 | A1 | 11/2018 | Mostowfi et al. | |
| 2019/0011423 | A1 | 1/2019 | Molla et al. | |
| 2020/0290040 | A1 | 9/2020 | Molla et al. | |

OTHER PUBLICATIONS

Chandan Mishra, Yoav Peles; An experimental investigation of hydrodynamic cavitation in micro-Venturis. Physics of Fluids Oct. 1, 2006; 18 (10): 103603. https://doi.org/10.1063/1.2360996.

Christiansen et al. Measuring CO2 minimum miscibility pressures: slim-tube or rising-bubble method? Energy & fuels 10.2 (1996): 443-449.

Christiansen et al. Rapid measurement of minimum miscibility pressure with the rising-bubble apparatus. SPE Reservoir Engineering 2.04 (1987): 523-527.

International Search Report & Written Opinion issued in International Application No. PCT/CA2021/051797 on Apr. 7, 2022.

Liu et al. Estimation of minimum miscibility pressure (MMP) of CO2 and liquid n-alkane systems using an improved MRI technique. Magnetic Resonance Imaging 34 (2016) 97-104.

M.A. Ahmadi, A. Bahadori; Chapter six—Fluid Sampling; Fluid Phase Behavior for Conventional and Unconventional Oil and Gas Reservoirs; Gulf Professional Publishing; 2017; pp. 293-332; ISBN 9780128034378; https://doi.org/10.1016/B978-0-12-803437-8.00006-3. (https://www.sciencedirect.com/science/article/pii/B9780128034378000063).

Nguyen et al. Fast Fluorescence-Based Microfluidic Method for Measuring Minimum Miscibility Pressure of CO2 in Crude Oils. Analytical Chemistry 2015 87 (6), 3160-3164. DOI: 10.1021/ac5047856.

Rezaei et al. A CO2-oil minimum miscibility pressure model based on multi-gene genetic programming. Energy Exploration & Exploitation, vol. 31, No. 4, 2013, pp. 607-622.

Sharbatian. Full Characterization of CO2-Oil Properties On-Chip: Solubility, Diffusivity, Extraction Pressure, Miscibility, and Contact Angle. Analytical Chemistry 2018 90 (4), 2461-2467. DOI: 10.1021/acs.analchem.7b05358.

Ungar et al. A New Fluidics Method to Determine Minimum Miscibility Pressure. IOR 2021—21st European Symposium on Improved Oil Recovery, Apr. 19-22, 2021.

Zou et al. Rapid Characterization of Multiple-Contact Miscibility: Toward a Slim-Tube on a Chip. Analytical Chemistry 2019 91 (21), 13681-13687. DOI: 10.1021/acs.analchem.9b02893.

Extended European Search Report issued on Nov. 11, 2024 in EP 21904712.3.

* cited by examiner

MICROFLUIDIC DEVICES, MICROFLUIDIC SYSTEMS, AND METHODS FOR ASSESSING THERMOPHYSICAL PROPERTIES OF A FLUID

CROSS REFERENCES TO RELATED APPLICATIONS

This application is a national stage entry of International Patent Application No. PCT/CA2021/051797 filed on Dec. 14, 2021, which claims the benefit of and/or priority to U.S. Provisional Patent Application No. 63/127,206 filed on Dec. 18, 2020, each of which is incorporated herein by reference in its entirety.

FIELD

This document relates to microfluidics. More specifically, this document relates to microfluidic devices such as microfluidic chips, systems including microfluidic devices, and methods for assessing thermophysical properties of a fluid.

U.S. Pat. No. 8,485,026 (Mostowfi) discloses a method of measuring thermo-physical properties of a reservoir fluid. The method includes introducing the fluid under pressure into a microchannel, establishing a stabilized flow of the fluid through the microchannel, inducing bubble formation in the fluid disposed in the microchannel, and determining the thermo-physical properties of the fluid based upon the bubbles formed as the fluid flows through the microchannel.

U.S. Pat. No. 9,752,430 (Mostowfi et al.) discloses an apparatus for measuring phase behavior of a reservoir fluid. The apparatus includes a first sample container and a second sample container in fluid communication with a microfluidic device defining a microchannel. A first pump and a second pump are operably associated with the sample containers and the microfluidic device to fill the microchannel with a reservoir fluid and to maintain a predetermined pressure of reservoir fluid within the microchannel.

SUMMARY

The following summary is intended to introduce the reader to various aspects of the detailed description, but not to define or delimit any invention.

Methods for assessing thermophysical properties of a study fluid are disclosed. According to some aspects, a method for assessing thermophysical properties of a study fluid includes: a. in a microfluidic channel, isolating at least a first slug of a study fluid within an isolation fluid; b. during and/or after step a., conducting a first optical investigation of the first slug to assess a thermophysical property of the study fluid; c. after step b., while maintaining the first slug in the microfluidic channel and isolated within the isolation fluid, modifying at least one of a pressure within the microfluidic channel and a temperature within the microfluidic channel; and d. during and/or after step c., conducting a second optical investigation of the first slug to re-assess the thermophysical property of the study fluid.

In some examples, step a. includes: filling the microfluidic channel with the isolation fluid, and while maintaining the microfluidic channel filled with the isolation fluid, loading the first slug into the microfluidic channel.

In some examples, step a. includes sandwiching the first slug of the study fluid between a first slug of the isolation fluid and a second slug of the isolation fluid. For example, step a. can include loading a set of secondary slugs of the study fluid into the microfluidic channel. The first slug of the isolation fluid can be sandwiched between the first slug of the study fluid and one of the secondary slugs of the study fluid, and the second slug of the isolation fluid can be sandwiched between the first slug of the study fluid and another one of the secondary slugs of the study fluid. For further example, step a. can include filling the microfluidic channel with the study fluid, and loading a first slug of the isolation fluid and a second slug of the isolation fluid into the microfluidic channel, to isolate the first slug of study fluid between the first slug of the isolation fluid and the second slug of the isolation fluid.

In some examples, step c. includes: while maintaining the microfluidic channel at a test temperature, and maintaining the first slug in the microfluidic channel and isolated within the isolation fluid, modifying the pressure in the microfluidic channel from a first pressure to a second pressure. Step b. can include assessing the thermophysical property of the study fluid at the test temperature and the first pressure. Step d. can include re-assessing the thermophysical property of the study fluid at the test temperature and the second pressure, and comparing the thermophysical property of the study fluid at the test temperature and second pressure to the thermophysical property of the study fluid at the test temperature and the first pressure.

The method can further include: e. repeating steps c. and d, to determine a bubble point pressure, a dew point pressure, a bubble point temperature, and/or a dew point temperature of the study fluid.

Modifying the pressure can include increasing or decreasing the pressure, and modifying the temperature can include increasing or decreasing the temperature.

In some examples, step c. includes: while maintaining the microfluidic channel at a test pressure and maintaining the first slug in the microfluidic channel and isolated within the isolation fluid, modifying the temperature in the microfluidic channel from a first temperature to a second temperature. Step d. can include assessing the thermophysical property of the study fluid at the test pressure and the second temperature.

In some examples, step d. includes inspecting an image of the slug to determine whether a bubble has appeared or dew has appeared. In some examples, step b. includes assessing a volume of a liquid phase and a volume of a gas phase in the first slug. Step d. can then include re-assessing the volume of the liquid phase and the volume of the gas phase of the first slug, and determining a change in the volume of the liquid phase and the volume of the gas phase over step c.

In some examples, step d. includes inspecting an image of the slug to determine whether asphaltenes have come out of solution, to assess the asphaltene onset pressure of the study fluid.

In some examples step d. includes inspecting an image of the slug to determine whether a gas hydrate has formed.

In some examples, step c. includes modifying the pressure to a predetermined pressure and modifying the temperature to a predetermined temperature. Step d. can include assessing a liquid volume of the first slug and a gas volume of the first slug to assess a gas to oil ratio of the study fluid. The predetermined pressure can be atmospheric pressure and the predetermined temperature can be about 60 degrees F. Step c. can include first lowering the temperature to the predetermined temperature, and then lowering the pressure to the predetermined pressure.

In some examples, step d. includes plotting a phase envelope for the oil composition.

In some examples, steps c. and d. are at least partially automated.

In some examples, during step b., the slug is generally stationary within the microfluidic channel.

Microfluidic systems are also disclosed. According to some aspects, a microfluidic system includes a microfluidic device having a microfluidic substrate. The microfluidic substrate has a microfluidic channel for isolating a slug of a study fluid within an isolation fluid. The system further includes a study fluid injection sub-system that houses the study fluid and that is configured to force the study fluid into the microfluidic channel. The system further includes an isolation fluid injection sub-system that houses the isolation fluid and that is configured to force the isolation fluid into the microfluidic channel. A pressure regulation sub-system regulates pressure in the microfluidic channel. A manifold provides fluid communication between the microfluidic device and the study fluid injection sub-system, the isolation fluid injection sub-system, and the pressure regulation sub-system. A temperature regulation sub-system regulates temperature within the microfluidic channel and the study fluid injection sub-system. An optical investigation sub-system provides optical access to at least a portion of the microfluidic channel.

In some examples, the microfluidic substrate further includes a study fluid inlet port in fluid communication with the microfluidic channel, an isolation fluid inlet port in fluid communication with the microfluidic channel, and an outlet port in fluid communication with the microfluidic channel. The microfluidic substrate can further include a bypass outlet port that is in fluid communication with the study fluid inlet port via a study fluid inlet channel. The study fluid injection sub-system can be in fluid communication with the study fluid inlet port, the isolation fluid injection sub-system can be in fluid communication with the isolation fluid injection port, and the pressure regulation sub-system can include a backpressure regulator in fluid communication with the outlet port.

In some examples, the isolation fluid is at least one of water, an ionic fluid, fluorocarbon oil, and a liquid metal.

In some examples, the system further includes a control sub-system connected to the study fluid injection sub-system, the isolation fluid injection sub-system, the pressure regulation sub-system, the temperature regulation sub-system, and the optical investigation sub-system, for providing automatic control of the microfluidic system.

BRIEF DESCRIPTION OF THE DRAWINGS

The drawings included herewith are for illustrating various examples of articles, methods, and apparatuses of the present specification and are not intended to limit the scope of what is taught in any way. In the drawings.

Figure 2:
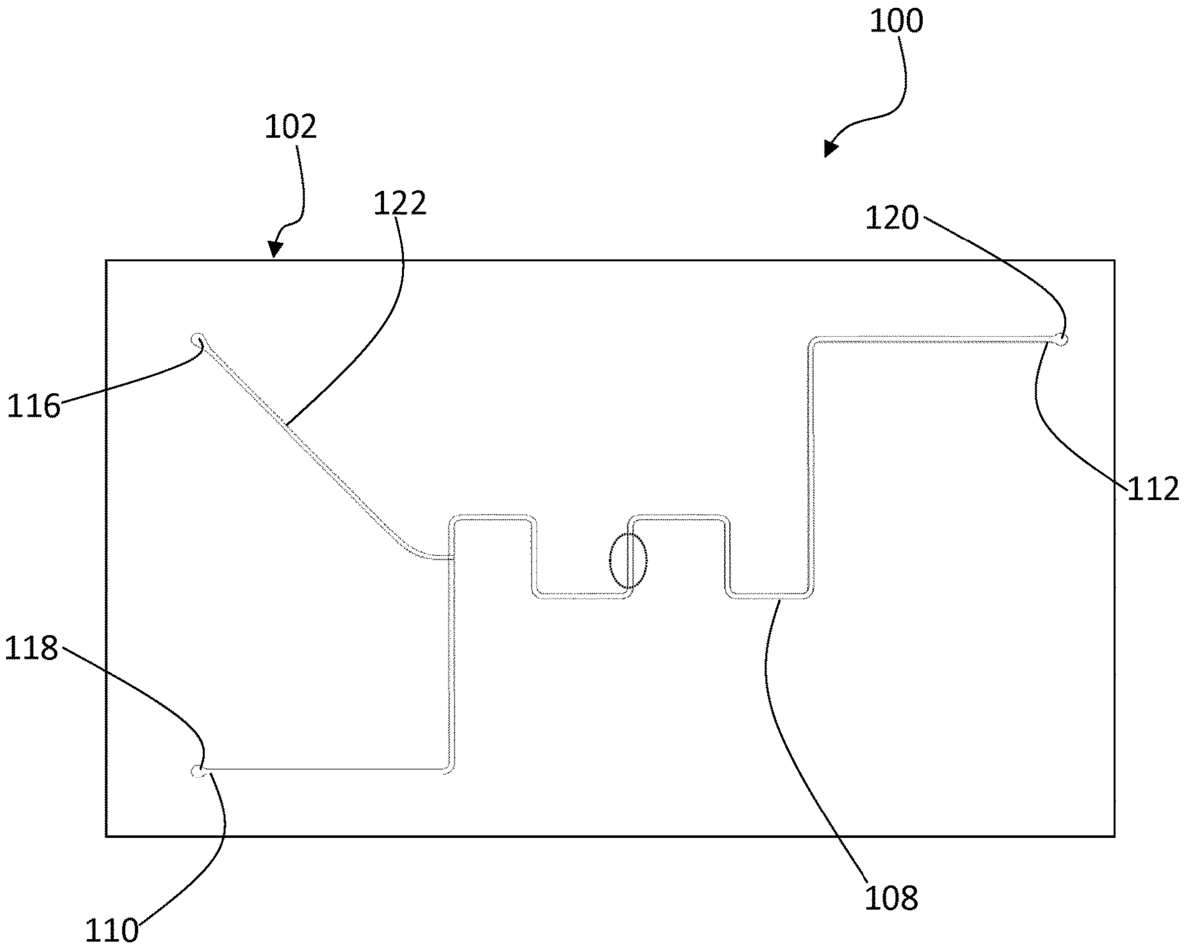
FIG. 2 is a plan view of the microfluidic device of FIG. 1.
Figure 6A:
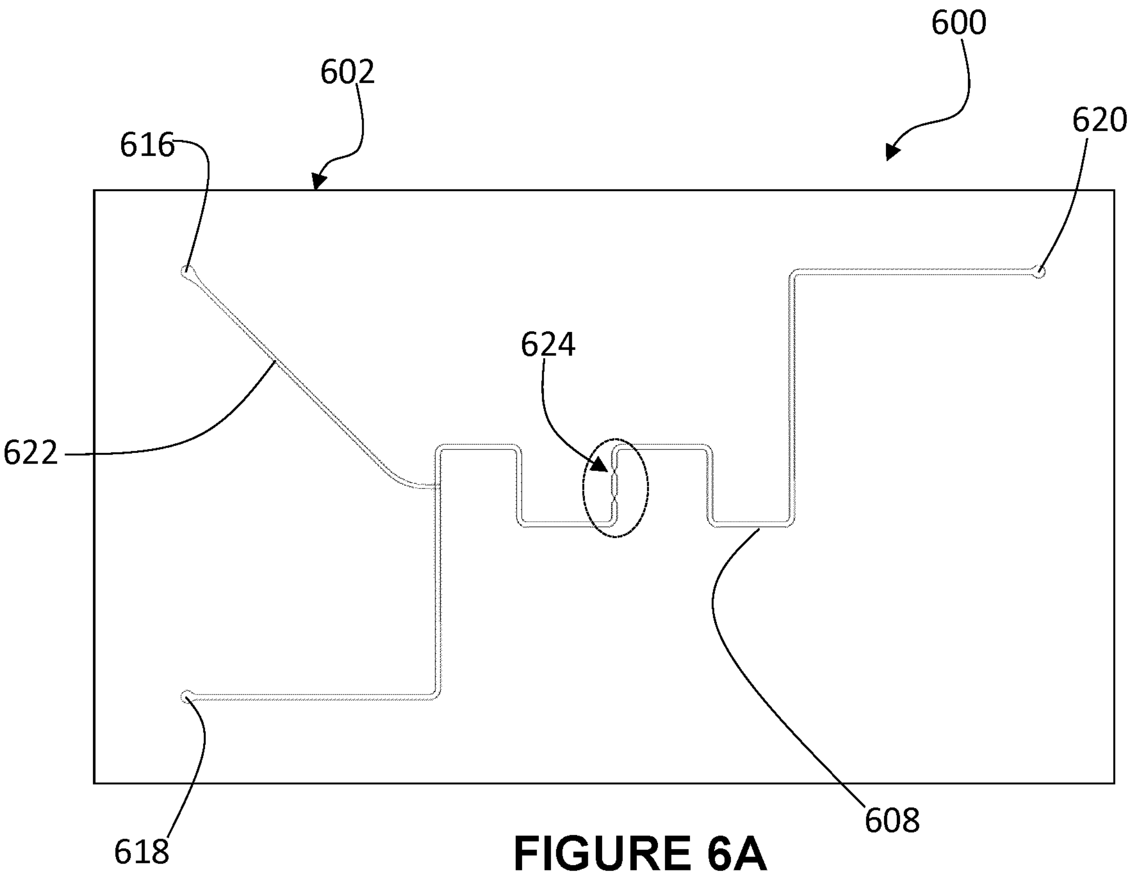
Figure 6B:
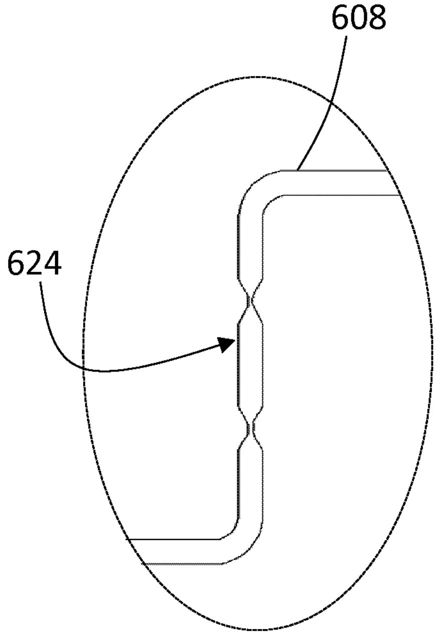
Figure 7A:
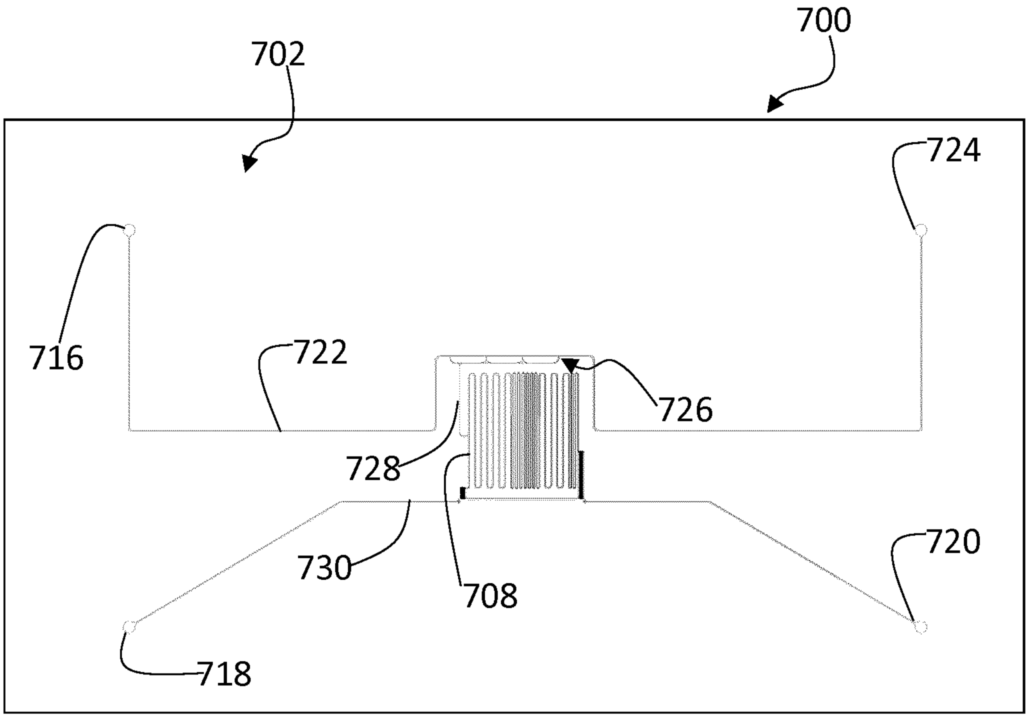
Figure 7B:
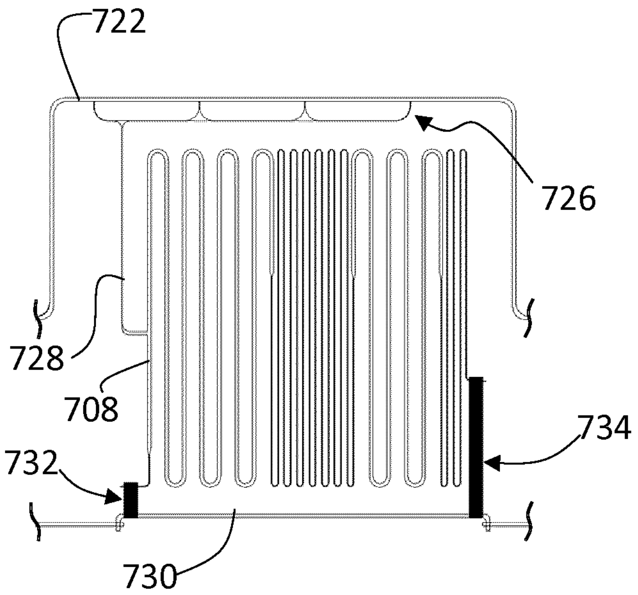
Figure 7C:
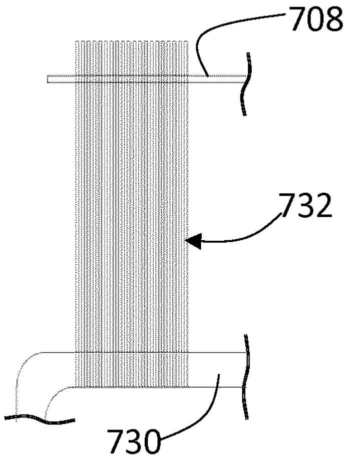
Figure 8A:
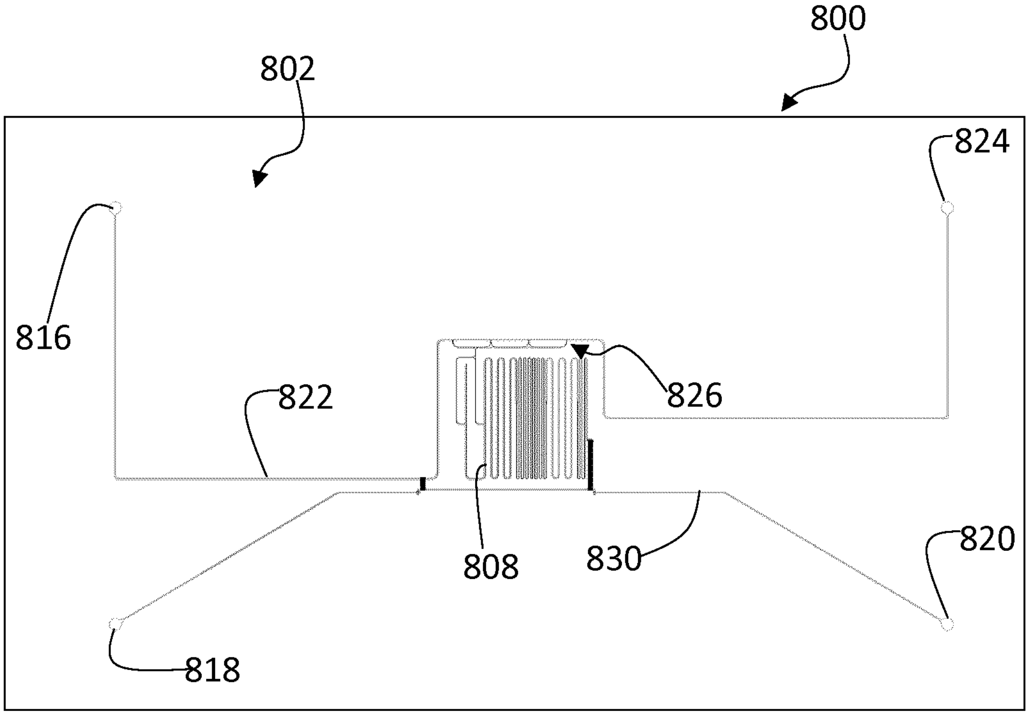
Figure 8B:
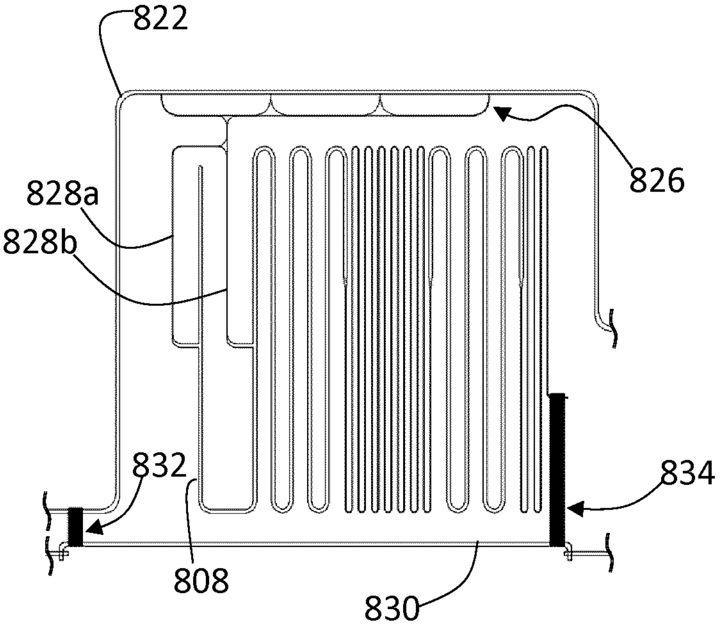
Figure 8C:
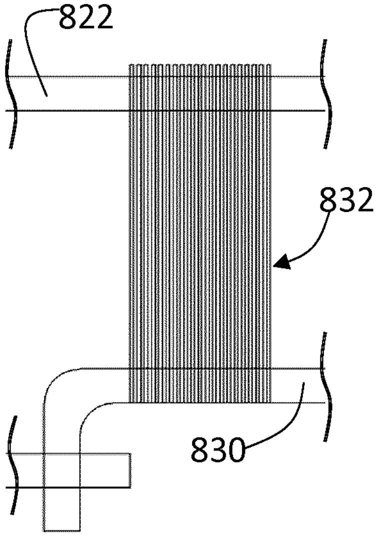

5C is an enlarged view of the encircled region in FIG. 2, showing an example in which the microfluidic channel is filled with a study fluid and contains a pair of slugs of an of an isolation fluid, which isolate a slug of the study fluid therebetween;

FIG. 6A is a plan view of another example microfluidic device;

FIG. 6B is an enlarged view of the encircled region in FIG. 6A;

FIG. 7A is a plan view of another example microfluidic device;

FIG. 7B is an enlarged view of a portion of the microfluidic device of FIG. 7A;

FIG. 7C is a further enlarged view of a portion of the microfluidic device of FIG. 7A;

FIG. 8A is a plan view of another example microfluidic device;

FIG. 8B is an enlarged view of a portion of the microfluidic device of FIG. 8A; and FIG. 8C is a further enlarged view of a portion of the microfluidic device of FIG. 8A.

DETAILED DESCRIPTION

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a divisional patent application, and the applicants, inventors or owners do not intend to abandon, disclaim or dedicate to the public any such subject matter by its disclosure in this document.

As used herein, the term "assess" includes (but is not limited to) determination, estimation, prediction, analysis, testing, and study. For example, the statement that "microfluidic devices can be used to assess the bubble point pressure of an oil composition" indicates that microfluidic devices can be used to determine, to estimate, to predict, to analyze, to test, and/or to study the bubble point pressure of an oil composition.

As used herein, the term "study fluid" refers to any fluid assessed by the devices, systems, and methods disclosed herein. Example study fluids include oil compositions, refrigerants, water methane blends, and/or consumer chemicals.

As used herein, the term "oil composition" refers to a composition that includes or is made up of an oil. An oil composition may be synthetic or naturally derived. An oil composition can be a crude oil, or a crude oil fraction (e.g. a portion of a crude oil that has been distilled or otherwise separated from the crude oil). An oil composition can be a sample that resembles (e.g. has a composition substantially similar to) a crude oil or a crude oil fraction. An oil composition can be a dead oil (i.e. an oil composition taken from a subterranean formation and that does not flash at ambient temperature and pressure) or a live oil (i.e. an oil composition taken from a subterranean formation and having dissolved gases that spontaneously evolve at ambient pressure and temperature). An oil composition can be a gas, a liquid, and/or a supercritical composition. An oil composition can be a single-component composition or a multi-component composition.

As used herein, the term "isolation fluid" refers to a fluid that is substantially immiscible with a given study fluid, such as an oil composition. The term "isolation fluid" can refer to a liquid, a gas, a supercritical fluid, or a combination thereof. The term "isolation fluid" can refer to a single-component fluid, or a mixture of different components. Example isolation fluids include water, liquid metals or alloys, and/or ionic fluids. Specific examples of isolation fluids include mercury, galinstan, fluorocarbon oil and/or polyethylene glycol.

As used herein, the term "thermophysical property" can refer to (but is not limited to) one or more of the following parameters of a study fluid: volume (e.g. volume of a slug of a study fluid), phase state (e.g. whether a slug of a study fluid is in gaseous state, a liquid state, and/or a solid state), presence, absence, or change of a component (e.g. presence or absence of asphaltene solids, gas hydrates, a bubble, and/or dew), conditions under which a component appears, disappears, or changes (e.g. asphaltene onset pressure, dew point pressure, bubble point pressure, dew point temperature, dew point pressure, gas hydrate formation conditions of a study fluid), phase envelope, and ratio of one phase state to another (e.g. gas-to-oil ratio).

As used herein, the term "about" indicates a degree of variability in a value or range, for example, within 10%, within 5%, or within 1% of a stated value or of a stated limit of a range.

All numerical ranges listed herein are inclusive of the bounds of those ranges. For example, the statement that a certain measurement may be "between 25 cm and about 75 cm" means that the measurement may be 25 cm, or 75 cm, or any number therebetween.

Generally disclosed herein are microfluidic devices in the form of microfluidic chips, systems incorporating microfluidic devices, and related methods. The microfluidic devices, systems, and methods can be used to assess the thermophysical properties of study fluids. For example, the microfluidic devices, systems, and methods can be used in the oil and gas industry, in order to predict behavior of oil compositions in oil-bearing subterranean formations (e.g. in shale and/or tight oil formations, as well as fracture zones (also known as "frac zones") created in such formations during hydraulic fracturing). More specifically, the microfluidic devices, systems, and methods can be used, for example, in order to assess the thermophysical properties of an oil composition. For example, the microfluidic devices, systems, and methods can be used to assess the bubble point pressure and/or temperature of an oil composition, the dew point pressure and/or temperature of an oil composition, to plot a phase envelope for an oil composition, and/or to assess a gas to oil ratio (GOR) of an oil composition.

In general, the microfluidic devices, systems, and methods disclosed herein can in some examples allow for fast, inexpensive, and/or reliable assessment of the thermophysical properties of oil compositions or other study fluids. More specifically, the microfluidic devices, systems, and methods disclosed herein can in some examples allow for fast, inexpensive, and/or reliable assessment of thermophysical properties such as bubble point pressure, phase envelope, and GOR. For example, the phase envelope of an oil composition can be assessed in a matter of hours (as opposed to days), using only a small volume of oil composition (e.g. less than 10 mL), with minimal labor and cost. Furthermore, the systems and methods disclosed herein can be automated and precisely controlled, which can allow for accuracy as well as reduced costs and reduced manpower.

In general, the microfluidic devices disclosed herein can include a microfluidic channel. The microfluidic channel can be loaded with one or more slugs of a study fluid, such as an oil composition, so that the slug(s) is/are isolated within an isolation fluid. As used herein, the term "isolated within an isolation fluid" indicates that a slug is bounded on opposite ends by isolation fluid, whether the isolation fluid is a generally continuous phase or is itself in slug form. For example, the microfluidic channel can be substantially filled with the isolation fluid, and a slug of the study fluid can then be loaded into the microfluidic channel so that the slug is isolated within the isolation fluid. Alternatively, the microfluidic channel can be substantially filled with the study fluid, and slugs of isolation fluid can be loaded into the microfluidic channel to isolate one or more slugs of the study fluid between the slugs of isolation fluid. While retaining the slug(s) in the microfluidic channel and isolated within the isolation fluid, various parameters can be modified, such as the pressure within the microfluidic channel and/or the temperature within the microfluidic channel, to assess the thermophysical properties of the study fluid. For example, the pressure in the microfluidic channel can be modified, and before, during, and after lowering the pressure, an optical investigation can be conducted (for example with the use of a microscope, and either in real time or by analyzing a video recording or still images) to assess the behavior of the slug(s) of the study fluid with lowering pressures. More specifically, in some examples, the microfluidic channel can be heated or cooled to a test temperature, and loaded with an isolation fluid. The microfluidic channel can then be pressurized to maintain the microfluidic channel well above the saturation pressure of the study fluid, and a slug of the study fluid can then be loaded into the microfluidic channel, so that the slug is in the microfluidic channel and isolated within the isolation fluid. The pressure in the microfluidic channel can then be lowered (e.g. in steps), and the slug can be observed at various pressures to determine the bubble point pressure. For example, images of the slug can be obtained as the pressure is lowered, and the volume of the slug can be measured at various pressures (i.e. can be measured once equilibrium has been reached at a given pressure step) using image analysis software. The volume can be plotted against pressure, and when the bubble point pressure is reached, the first bubble of the gas phase will appear, and the slope of the pressure-volume curve will change sharply. Alternatively, images of the slug can be obtained, and the bubble point pressure can be determined by observation of the first gas bubble in the images. In further examples, as will be described below, the phase envelope of the study fluid can be plotted, and/or the GOR can be measured.

Notably, in some examples of the methods described herein, after the slug(s) is/are loaded into the microfluidic channel, the slug(s) remains generally stationary within the microfluidic channel over the remainder of the method. That is, while the slug(s) may move somewhat within the microfluidic channel, the slug(s) generally do not pass entirely through and exit the microfluidic channel while the parameters are modified (e.g. while temperature and/or pressure are lowered), while equilibrium is reached, and while any real time steps of optical investigation are conducted. Instead, while the parameters are modified and equilibrium is reached, the microfluidic channel is generally closed to mass transfer of the study fluid, and the slug(s) generally remain in the microfluidic channel and bounded by the isolation fluid.

Figure 1:
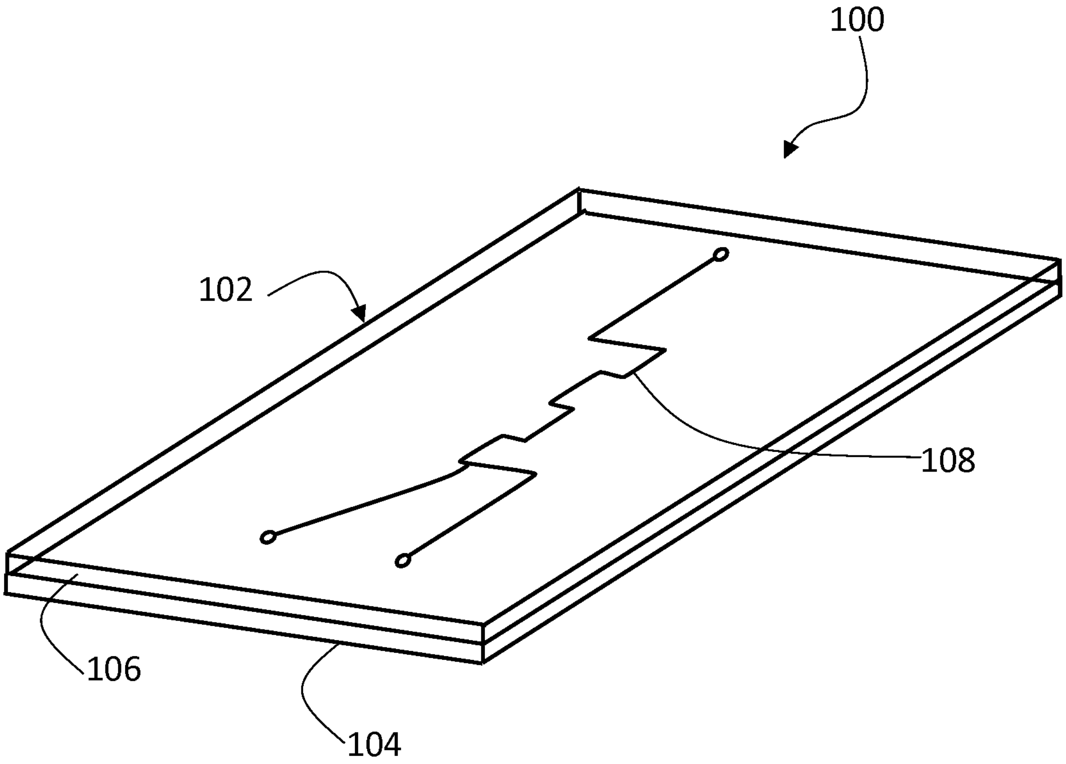
FIG. 1 is a perspective view of an example microfluidic device.

Referring now to FIG. 1, an example microfluidic device 100 is shown. The microfluidic device 100 may also be referred to as a "microfluidic chip". The microfluidic device 100 includes a microfluidic substrate 102 that has various microfluidic features therein (i.e. fluid channels and fluid ports, described in further detail below). The microfluidic substrate 102 allows for optical investigation (e.g. imaging, optionally with the use of an optical microscope and/or video recording equipment and/or a photographic camera) of at least some of the microfluidic features.

Referring still to FIG. 1, in the example shown, the substrate 102 includes a base panel 104 in which the microfluidic features are etched, and a cover panel 106 that is secured to the base panel 104 and that covers the microfluidic features. In the example shown, the base panel 104 is an opaque silicon panel, and the cover panel 106 is a transparent glass panel. In alternative examples, the substrate 102 may be of another configuration. For example, both the base panel 104 and the cover panel 106 can be a transparent glass panel, or the base panel 104 can be a transparent glass panel while the cover panel 106 can be an opaque silicon panel.

Referring also to FIG. 2, the substrate 102 includes a microfluidic channel 108, as mentioned above. As used herein, the term "microfluidic channel" refers to a narrow and elongate (e.g. having a length that is greater than its width, such as a length to width ratio of at least 10:1 or at least 25:1 or at least 50:1 or at least 100:1) feature through which substances (e.g. isolation fluids and/or study fluids) can flow. The microfluidic channel 108 can, for example, be etched and/or drilled into the base panel 104 (shown in FIG. 1) of the substrate 102.

Referring still to FIG. 2, in the example shown, the microfluidic channel 108 has a first end 110 and a second end 112, and a length (also referred to herein as a "microfluidic channel length") that is defined between the first end 110 and the second end 112. The microfluidic channel length can be, for example, between about 1 cm and about 50 cm (e.g. about 10 cm). The microfluidic channel 108 further has a width (also referred to herein as a "microfluidic channel width"). The microfluidic channel width can be, for example, between about 5 microns and about 200 microns (e.g. about 100 microns). Furthermore, the microfluidic channel has a depth (also referred to herein as a "microfluidic channel depth"). The microfluidic channel depth can be, for example, between about 50 microns and about 300 microns (e.g. about 100 microns).

Referring still to FIG. 2, in the example shown, the microfluidic channel 108 is of a serpentine configuration (i.e. it extends non-linearly between the first end 110 and the second end 112). In alternative examples, the microfluidic channel 108 can be of a straight configuration, or another shape.

In some examples, the microfluidic channel can include a nucleation site (not shown) to facilitate nucleation, so as to aid in preventing superheating of the study fluid.

Referring still to FIG. 2, in the example shown the microfluidic substrate 102 further includes a study fluid inlet port 116, an isolation fluid inlet port 118, and an outlet port 120, each of which is in fluid communication with the microfluidic channel 108.

In the example shown, the study fluid inlet port 116 is in fluid communication with the microfluidic channel 108 via a study fluid inlet channel 122 that extends towards the microfluidic channel 108 from the study fluid inlet port 116, for loading study fluid (e.g. one or more slugs of study fluid or a continuous phase of study fluid) into the microfluidic channel 108. The study fluid inlet channel 122 has a length (also referred to herein as a "study fluid inlet channel length"), a width (also referred to herein as a "study fluid inlet channel width"), and a depth (also referred to herein as a "study fluid inlet channel depth). The study fluid inlet channel length can be, for example, between about 0.5 cm and about 20 cm (e.g. about 2 cm). The study fluid inlet channel width can be, for example, between about 2 microns and about 100 microns (e.g. about 5 microns). The study fluid inlet channel depth can be, for example between about 0.1 micron and about 5 microns (e.g. about 0.5 microns). In the example shown, the study fluid inlet channel 122 is shallower and narrower than the microfluidic channel 108. In alternative examples, the study fluid inlet channel 122 can be of the same width and depth as the microfluidic channel 108.

In the example shown, the isolation fluid inlet port 118 is in direct fluid communication with the first end 110 of the microfluidic channel 108, for loading an isolation fluid (e.g. one or more slugs of isolation fluid or a continuous phase of isolation fluid) into the microfluidic channel 108.

In the example shown, the outlet port 120 is in direct fluid communication with the second end 112 of the microfluidic channel 108, for allowing egress of fluids from the microfluidic channel 108, and for allowing a back pressure to be applied to the microfluidic channel 108 (as will be described below).

The study fluid inlet port 116, isolation fluid inlet port 118, outlet port 120, and study fluid inlet channel 122 can, for example, be etched and/or drilled into the base panel 104 (shown in FIG. 1) of the substrate 102.

The terms "study fluid inlet port", "isolation fluid inlet port", "outlet port", and "study fluid inlet channel" are used herein for simplicity, and are not intended to limit the use of these ports and channels. For example, while the "study fluid inlet port" may in many examples be used to load a study fluid into the microfluidic device 100, it may in other examples be used to load other materials (such as an isolation fluid), or may be used for egress of materials from the microfluidic device 100.

Figure 3:
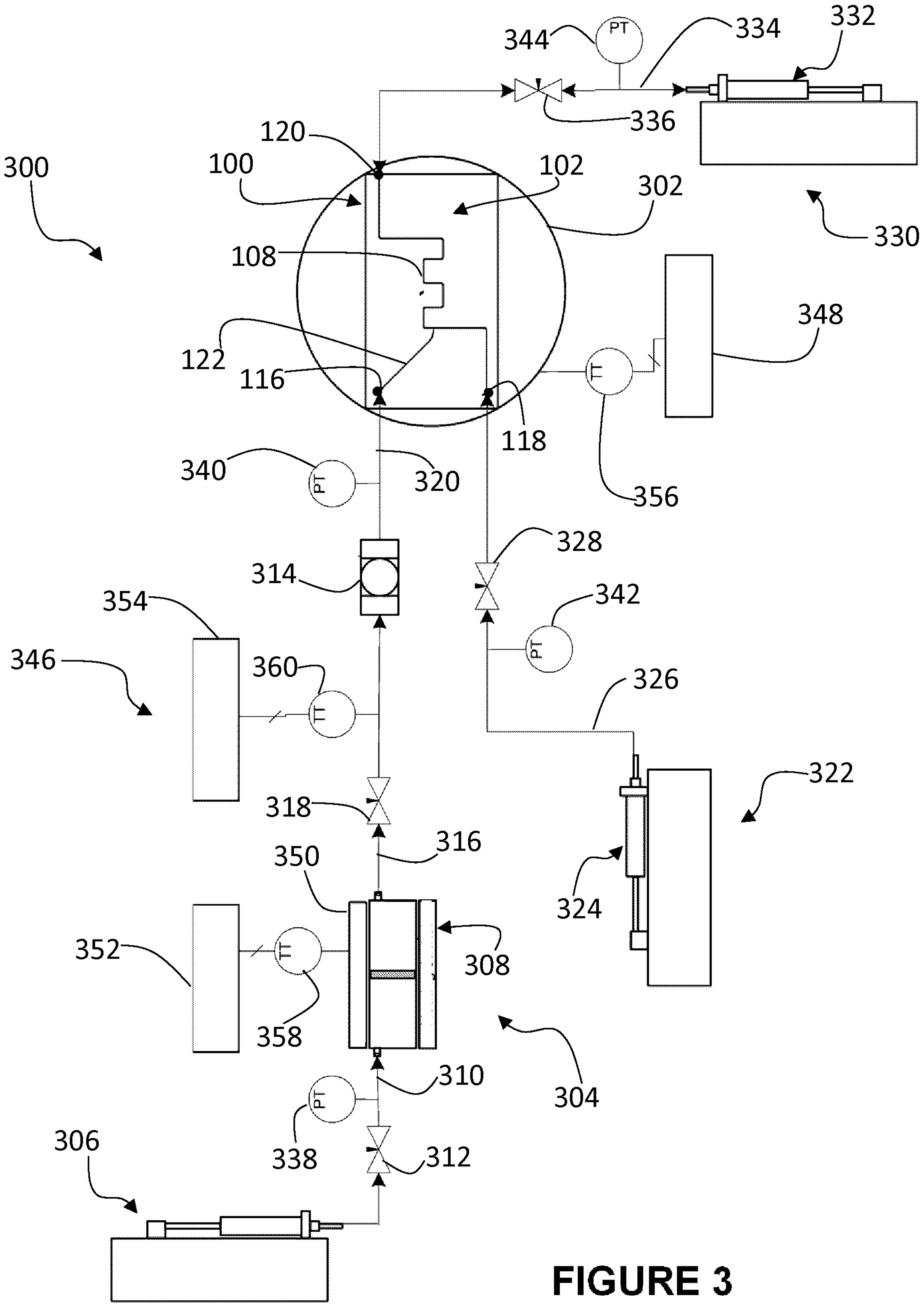
FIG. 3 is a schematic view of an example microfluidic system including the microfluidic device of FIGS. 1 and 2.

Referring now to FIG. 3, an example microfluidic system 300 is shown. As shown, the microfluidic system 300 includes the microfluidic device 100 of FIGS. 1 and 2; however, in alternative examples, the microfluidic system 300 can include various other microfluidic devices, such as those described below with regards to FIGS. 6 to 8. Furthermore, the microfluidic device 100 can be used in various other microfluidic systems.

Referring still to FIG. 3, in the example shown, the microfluidic device 100 is supported by a manifold 302 (which can also be referred to as a "holder"), which supports the microfluidic device 100, helps to distribute pressures across the microfluidic device 100, helps to heat or cool the microfluidic device 100, and provides for fluid communication between other parts of the system 300 (i.e. a study fluid injection sub-system, an isolation fluid injection sub-system, and a pressure regulation sub-system, as described below) and the microfluidic device 100. Examples of suitable holders are described in international patent application publication no. WO 2020/037398 (de Haas et al.) and in U.S.

patent application publication no. 2020/0309285 (Sinton et al.), which are incorporated herein by reference in their entirety.

Referring still to FIG. 3, the microfluidic system 300 further includes a study fluid injection sub-system 304 in fluid communication with the study fluid inlet port 116 of the microfluidic device 100 via the manifold 302, for forcing a study fluid into the microfluidic device 100. That is, the study fluid injection sub-system 304 houses a study fluid (such as an oil composition), and can force the study fluid into the microfluidic channel 108 via the study fluid inlet port 116. In the example shown, the study fluid injection sub-system 304 includes a first syringe pump 306 that is hydraulically connected to a study fluid storage cylinder 308 via line 310 and valve 312. The study fluid storage cylinder 308 can house, for example, a sample of live oil that is to be assessed with the system 300. The study fluid storage cylinder 308 is in fluid communication with a high-pressure filter 314 via line 316 and valve 318. The high-pressure filter 314 is in fluid communication with the study fluid inlet port 116 of the microfluidic device 100, via line 320 and via the manifold 302.

Referring still to FIG. 3, the microfluidic system 300 further includes an isolation fluid injection sub-system 322 that is in fluid communication with the isolation fluid inlet port 118 of the microfluidic device 100 via the manifold 302. The isolation fluid injection sub-system 322 houses an isolation fluid, and can force the isolation fluid into the microfluidic device 100. The isolation fluid injection sub-system 322 can force the isolation fluid through the microfluidic channel from the isolation fluid inlet port 118 towards the outlet port 120. In the example shown, the isolation fluid injection sub-system 322 includes a second syringe pump 324 that is in fluid communication with the isolation fluid inlet port 118 of the microfluidic device 100 via line 326 and valve 328.

Referring still to FIG. 3, the microfluidic system 300 further includes a pressure regulation sub-system 330, for regulating the pressure within the microfluidic device 100 (i.e. for regulating the pressure within the microfluidic channel 108). In the example shown, the pressure regulation sub-system 330 includes a backpressure regulator in the form of a third syringe pump 332, which also houses the isolation fluid, and which is in fluid communication with the outlet port 120 of the microfluidic device 100 via line 334 and valve 336. The pressure regulation sub-system 330 further includes a first pressure transducer 338 for measuring the pressure in line 310, a second pressure transducer 340 for measuring the pressure in line 320, a third pressure transducer 342 for measuring the pressure in line 326, and a fourth pressure transducer 344 for measuring the pressure in line 334.

In alternative examples, the pressure regulation sub-system and the isolation fluid injection sub-system can be integrated as a single sub-system.

Referring still to FIG. 3, the microfluidic system further includes a temperature regulation sub-system 346, for regulating the temperature of at least the microfluidic device 100 (i.e. for regulating the temperature in the microfluidic channel 108). In the example shown, the temperature regulation sub-system 346 includes a first heater 348 for regulating the temperature of the microfluidic device 100 by heating the manifold 302, a heating jacket 350 surrounding the study fluid storage cylinder 308, a second heater 352 for heating the heating jacket 350, a third heater 354 for heating line 316, and temperature transducers 356, 358, and 360, respectively, connected to each of the heaters 348, 352, and 354.

In alternative examples, the temperature regulation sub-system 346 can be configured to cool microfluidic device 100 and/or other parts of the system.

The microfluidic system 300 can further include an optical investigation sub-system (not shown), for optically accessing the microfluidic channel 108 (i.e. the entire microfluidic channel 108 or a portion thereof), and optionally other features of the microfluidic device 100. The optical investigation sub-system can include, for example, one or more microscopes having a viewing window in which all or a portion of the microfluidic channel 108 can sit, one or more laser analysis systems, one or more photodiode analysis systems, one or more video cameras, and/or one or more still image cameras. The optical investigation sub-system can be computerized and can further include image processing software and image analysis software. The image processing software can optionally automatically process images captured by the optical investigation sub-system, and the image analysis software can optionally automatically analyze images the processed images.

The microfluidic system 300 can further include a control sub-system (not shown) connected to the study fluid injection sub-system 304, the isolation fluid injection sub-system 322, the pressure regulation sub-system 330, the temperature regulation sub-system 346, and the optical investigation sub-system. The control sub-system can include one or more processors, which can receive, process, and/or store information received from the study fluid injection sub-system 304, the isolation fluid injection sub-system 322, the pressure regulation sub-system 330, the temperature regulation sub-system 346, and the optical investigation sub-system. For example, the control system can receive temperature information from the temperature transducers 356, 358, and 360, and pressure information from the pressure transducers 338, 340, 342, and 344. Furthermore, the control sub-system can send instructions to the study fluid injection sub-system 304, the isolation fluid injection sub-system 322, the pressure regulation sub-system 330, the temperature regulation sub-system 346, and/or the optical investigation sub-system. For example, the control system can instruct the temperature regulation sub-system 346 to increase and/or decrease the output of one or more of the heaters 348, 352, and 354. The control sub-system can optionally provide automatic control of the microfluidic system 300. For example, the control sub-system can be configured to automatically instruct the temperature regulation sub-system 346 to increase and/or decrease the output of one or more of the heaters 348, 352, and 354, based on the received temperature information. The control sub-system can provide similar instructions to the pressure regulation sub-system 330.

The microfluidic system can further include a vibrating element (not shown) or a high power laser to facilitate bubble nucleation in the study fluid inside a microfluidic channel.

Methods of assessing thermophysical properties of a study fluid, particularly an oil composition, will now be described. The methods will be described with reference to the microfluidic device 100 and the microfluidic system 300; however, the methods are not limited to the microfluidic device 100 and the microfluidic system 300, and the microfluidic device 100 and microfluidic system 300 are not limited to operation in accordance with the methods. Furthermore, for clarity, the methods with be described with reference to a certain sequence of steps (e.g. a given step may be described as “a first step” or “a second step”, or terms such as “then” or “next” may be used); however, unless expressly indicated as such in the claims, the methods are not limited to any particular sequence of steps.

In general, the methods can include isolating a first slug of a study fluid within an isolation fluid in a microfluidic channel. Then, while maintaining the first slug in the microfluidic channel and isolated within the isolation fluid, the pressure within the microfluidic channel and/or the temperature within the microfluidic channel can be modified. Before, during, and/or after modifying the pressure and/or temperature, an optical investigation of the first slug can be conducted, to assess one or more thermophysical properties of the study fluid (e.g. to assess the bubble point pressure of the study fluid, to plot a phase envelope for the study fluid, and/or to assess the gas to oil ratio of the study fluid).

Figure 4:
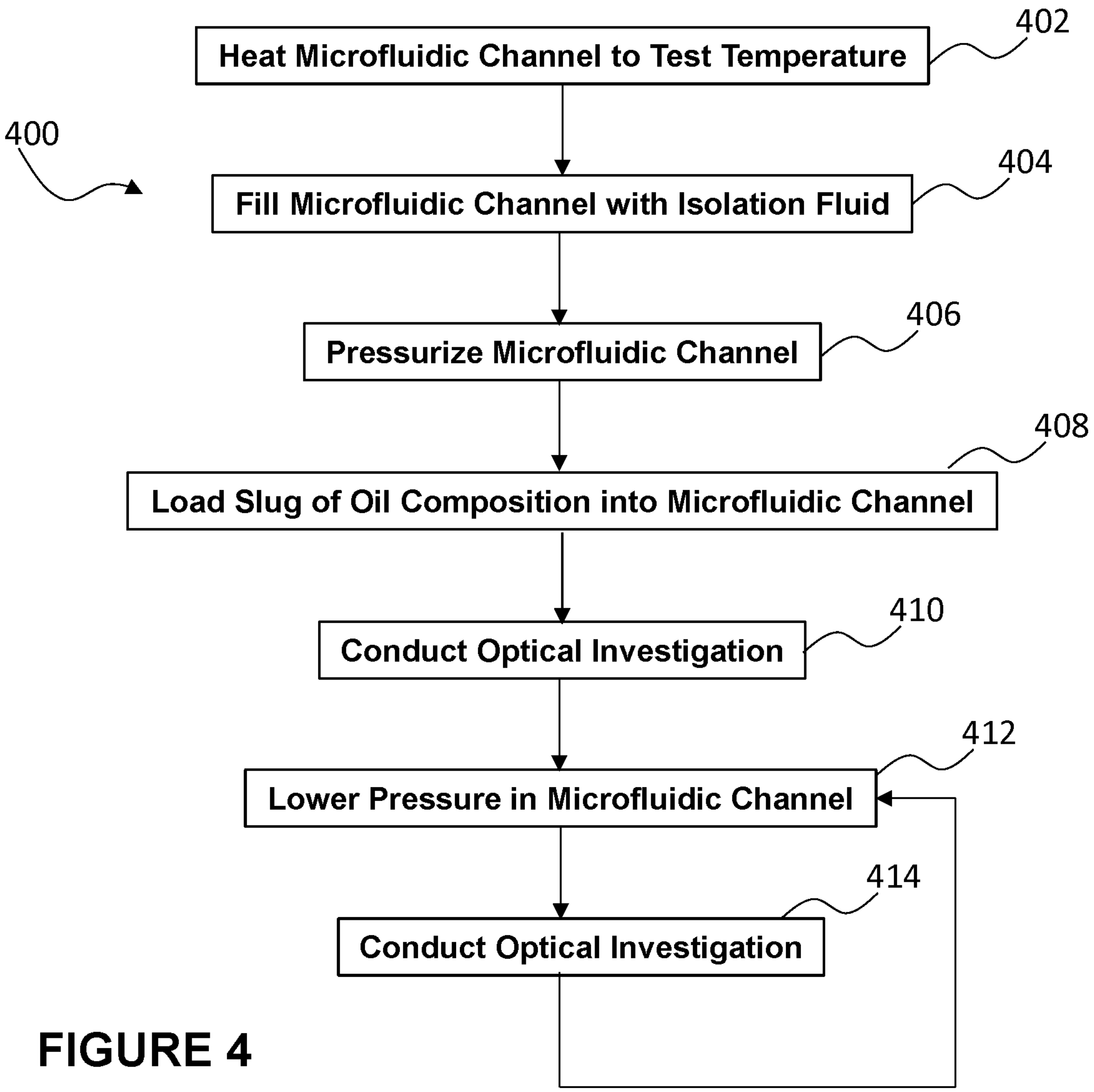
FIG. 4 is a flowchart showing an example method for assessing the bubble point pressure of an oil composition.

More specifically, an example method 400 for assessing the bubble point pressure of an oil composition is shown in FIG. 4. Referring to FIGS. 3 and 4, in the example shown, at step 402, the temperature regulation sub-system 346 can be engaged, to heat the microfluidic channel 108 of the microfluidic device 100 to a test temperature, and also to heat the study fluid storage cylinder 308 and line 316 to the test temperature. The test temperature can be, for example, between about 25 degrees C. and about 200 degrees C. (e.g. about 99 degrees C.).

At step 404, while continuing to maintain the microfluidic channel 108 at the test temperature, valves 328 and 336 can be opened and the second syringe pump 324 can be engaged, to fill the microfluidic channel 108 with the isolation fluid by flowing the isolation fluid from the second syringe pump 324 to the third syringe pump 332 via the microfluidic channel 108.

At step 406, valve 328 can be closed and the third syringe pump 332 can be engaged, to apply a back pressure to the microfluidic channel 108. The back pressure can be applied to pressurize the microfluidic channel 108 to a first pressure. The first pressure can be well above the saturation pressure of the oil composition, for example, between 1 bara and 1000 bara.

Figure 5A:
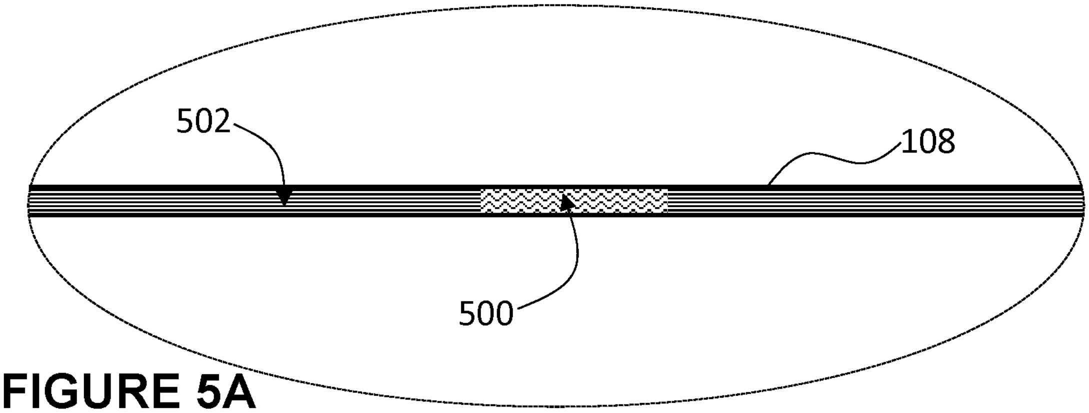
FIG. 5A is an enlarged view of the encircled region in FIG. 2, showing an example in which the microfluidic channel is filled with an isolation fluid and contains a slug of an oil composition.

At step 408, while continuing to apply back pressure to maintain the microfluidic channel 108 at the first pressure, and while maintaining the microfluidic channel 108 filled with the isolation fluid, a first slug of oil composition can be loaded into the microfluidic channel 108. More specifically, valves 312 and 318 can be opened, and the first syringe pump 306 can be engaged, to force an aliquot of the oil composition from the study fluid cylinder 308 and into the study fluid inlet channel 122. As the aliquot enters the microfluidic channel 108 from the study fluid inlet channel 122, valves 312 and 318 can be closed and the first syringe pump 306 can be disengaged. Then, while continuing to apply back pressure, valve 328 can be opened and the second syringe pump 324 can be engaged, so that the flow of isolation fluid drives a slug of the oil composition into the microfluidic channel 108, and so that the slug is isolated in the isolation fluid. FIG. 5A shows a depiction of the first slug 500 in the microfluidic channel 108 and isolated within the isolation fluid 502.

Once loading of the microfluidic channel 108 with the first slug 500 of the oil composition is complete, valve 328 can be closed and the second syringe pump 324 can be disengaged, while continuing to apply back pressure to maintain the microfluidic channel 108 at the first pressure. Then, at step 410, a first optical investigation can be conducted to assess one or more thermophysical properties of the oil composition. For example, the optical investigation can include obtaining images of the first slug 500, and analyzing the images to determine the volume of the first slug 500 at the test temperature and first pressure. Alternatively, the optical investigation can include using a laser analysis system or a photodiode analysis system to assess the thermophysical properties of the first slug 500. All or a portion of step 410 can be carried out in real time. For example, images can be captured in real time. Then, the analysis of the images can either be carried out in real time (e.g. while the first slug 500 is in the microfluidic channel), or can be carried out at a later time (e.g. based on still images or a video recording of the slug). Optionally, step 410 can be at least partially automated. For example, as mentioned above, the control system can include image processing and analysis software that can assess the volume of the first slug 500.

At step 412, while maintaining the microfluidic channel 108 at the test temperature, maintaining the first slug 500 isolated in the microfluidic channel 108, and maintaining the microfluidic channel 108 filled with the isolation fluid 502, the pressure in the microfluidic channel 108 can be lowered. More specifically, the second syringe pump 324 and/or third syringe pump 332 can be engaged (while opening the corresponding valves), to lower the pressure in the microfluidic channel 108 from the first pressure to a second pressure. The second pressure can be, for example, between about 1 bara and about 1000 bara (e.g. about 300 bara), or about 5 to 10 bar lower than the first pressure.

At step 414, once equilibrium has been reached, a second optical investigation can then be conducted, to re-assess the thermophysical properties of the oil composition at the test temperature and the second pressure. For example, images of the first slug 500 can be obtained and analyzed to re-assess the volume of the first slug 500 (i.e. to determine the volume of the first slug at the test temperature and second pressure), and to determine a change in volume as a result of the lowered pressure. Alternatively or in addition, an image of the first slug 500 can be inspected to determine whether a bubble has appeared. As described with respect to step 410, all or a portion of step 414 can be carried out in real time.

The steps of lowering the pressure in the microfluidic channel 108 and conducting an optical investigation at the lowered pressure (i.e. steps 412 and 414) can be repeated, optionally in a step-wise fashion, until the bubble point pressure of the oil composition is determined. For example, the steps can be repeated until a first bubble is visible in images of the first slug 500. Alternatively, the steps can be repeated until the slope of the pressure-volume curve changes sharply.

As noted above, in method 400, after the first slug 500 is loaded into the microfluidic channel 108 (i.e. after step 408), the first slug 500 remains generally stationary within the microfluidic channel 108 over the remainder of the method (i.e. during step 412 and any real time portions of steps 410 and 414). That is, while the first slug 500 may move somewhat within the microfluidic channel 108 during steps 410 to 414, it does not flow through and exit the microfluidic channel 108 as the pressure is lowered, while equilibrium is reached, and while any real time steps of the optical investigations are conducted. During these steps, the microfluidic channel 108 is generally closed to mass transfer of the oil composition, and the first slug 500 generally remains in the microfluidic channel 108 and surrounded by the isolation fluid 502, and remains available for optical investigation.

In alternative examples, the dew point pressure of the oil composition can be assessed. In such examples, the method can be similar to method 400 described above; however, the pressure can be increased over the course of the method (as opposed to decreased), until dew appears.

In further alternative examples, the bubble point or dew point temperature of the oil composition can be assessed. In such examples, the method can be similar to method 400 described above; however, the method can be carried out at a generally constant test pressure, and the volume of the first slug can be assessed at various temperatures (i.e. a first temperature, a second temperature, and so on).

In further alternative examples, the gas to oil ratio (GOR) of the oil composition can be assessed. In such examples, the method can be similar to method 400 described above; however, after initially filling the microfluidic channel 108 with the isolation fluid 502 and loading the first slug 500 into the microfluidic channel 108, the temperature in the microfluidic channel 108 can be lowered to a predetermined temperature (e.g. about 60 degrees F.), and then the pressure in the microfluidic channel 108 can be lowered to a predetermined pressure (e.g. about atmospheric pressure, or 1 bara). An optical investigation can then be carried out to assess a liquid volume of the first slug 500 and a gas volume of the first slug 500, to thereby assess a gas to oil ratio of the oil composition.

In further alternative examples, a phase envelope can be plotted for the oil composition. That is, in addition to the steps described above, the method can be repeated with additional slugs of oil composition in additional phase states, or with the same slug in another phase state, or with additional slugs of different volumes, or by performing dew point and bubble point pressure measurements at different test temperatures, or by performing dew point and bubble point temperature measurements at different test pressures. For example, the method can be carried out with the first slug 500 loaded into the microfluidic channel 108 in a liquid-only state, and with a second slug (not shown) that is in a liquid only state. For further example, the method can initially be carried out with a first slug 500 loaded into the microfluidic channel 108 in a liquid-only state, and the method can include reducing the pressure until the first slug 500 is in a gas+liquid phase state. For further example, the method can be carried out with a first slug 500 having a first volume, and also with a second slug (not shown) that has a second volume. In such examples, the first slug 500 and the second slug can optionally be in the microfluidic channel 108 concurrently, separated by isolation fluid, and the optical investigation of each slug can optionally be carried out concurrently. Alternatively, the method can initially be carried out with the first slug 500, and can then be repeated with the second slug.

In addition, quality lines inside the phase envelope can be plotted by assessing the pressure required to achieve a certain liquid or gas volume percentage. This can be carried out with a single slug or multiple slugs in the microfluidic channel 108.

In further alternative examples, the asphaltene onset pressure of the oil composition can be assessed. In such examples, the method can be similar to method 400 described above; however, the optical investigation can include assessing the pressure at which asphaltenes precipitate in the first slug 500 of the oil composition.

In further alternative examples, gas hydrate formation conditions of the oil composition can be assessed. In such examples, the method can be similar to method 400 described above; however, the study fluid can be a mixture of a gas (e.g. methane, argon, or nitrogen) and water, and the temperature and pressure can be modified (e.g. by decreasing the temperature and increasing the pressure in a stepwise fashion) until the optical investigation indicates that a gas hydrate has formed.

Figure 5B:
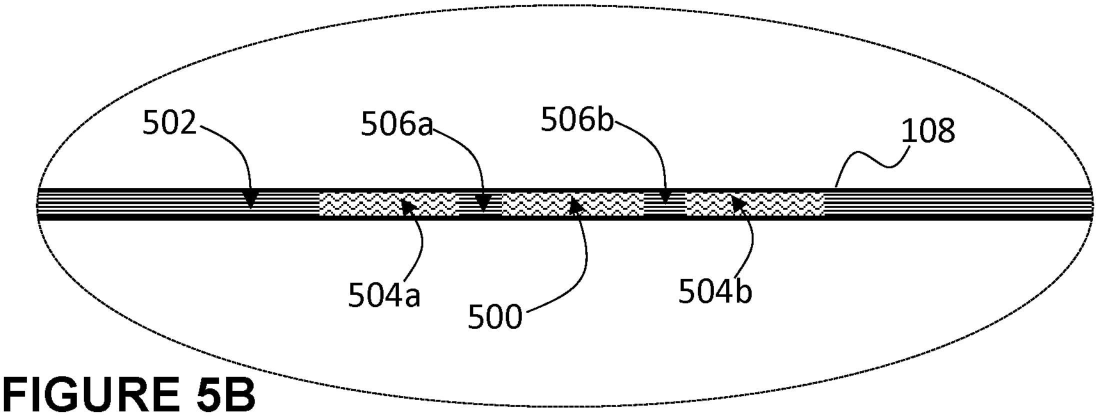
FIG. 5B is an enlarged view of the encircled region in FIG. 2, showing an example in which the microfluidic channel is filled with an isolation fluid and contains a slug of an oil composition, as well as two secondary slugs of the oil composition.
Figure 5C:
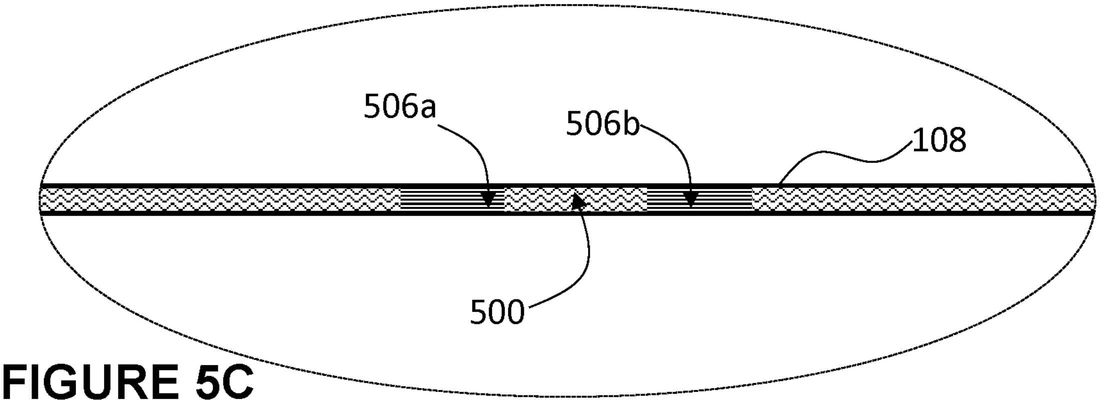

In the example of FIGS. 4 and 5A, the microfluidic channel 108 is substantially filled with the isolation fluid 502. In alternative examples, the isolation fluid can be in slug form, and the first slug of study fluid can be sandwiched between slugs of isolation fluid. For example, referring to FIG. 5B, in addition to the first slug 500 of study fluid, a set of secondary slugs 504*a*, 504*b* of study fluid can be loaded into the microfluidic channel 108. In the example shown, two secondary slugs 504*a*, 504*b* of study fluid are loaded into the microfluidic channel 108; however, in alternative examples, additional secondary slugs of study fluid may be used. Loading the secondary slugs 504*a*, 504*b* of study fluid into the microfluidic channel separates slugs 506*a*, 506*b* of isolation fluid from the continuous phase 502 of isolation fluid 502. The slugs 506*a*, 506*b* of isolation fluid are positioned between the secondary slugs 504*a*, 504*b* of study fluid and the first slug 500 of study fluid. That is, the first slug 500 of study fluid is isolated between first 506*a* and second slugs 506*b* of isolation fluid. In turn, the first slug 506*a* of isolation fluid is sandwiched between the first slug 500 of study fluid and the secondary slug 504*a* of study fluid, and the second slug 506*b* of isolation fluid is sandwiched between the first slug 500 of study fluid and the other secondary slug 504*b* of study fluid. For further example, referring to FIG. 5C, the microfluidic channel 108 can be substantially filled with the study fluid, and then first 506*a* and second 506*b* slugs of isolation fluid can be loaded into the microfluidic channel 108, to isolate a first slug 500 of the study fluid between the first 506*a* and second 506*b* slugs of isolation fluid. It is believed that by employing slugs 506*a*, 506*b* of isolation fluid, mass transfer between the first slug 500 of study fluid and the isolation fluid over the course of the assessment may be limited. That is, in the example of FIG. 5A, depending on the nature of the fluids, mass transfer between the first slug of study fluid 500 and the isolation fluid 502 may occur over the course of the assessment. However, in FIGS. 5B and 5C, some mass transfer may initially occur, but due to the relatively small volume of isolation fluid, the slugs 506*a*, 506*b* of isolation fluid may relatively quickly become saturated, and mass transfer may cease. This may result in more accurate and/or reliable results.

Referring now to FIGS. 6A and 6B, an additional example of a microfluidic device is shown. Features in FIGS. 6A and 6B that are like those of FIGS. 1 and 2 will be referred to with like reference numerals as in FIGS. 1 and 2, incremented by 500. The microfluidic device 600 of FIGS. 6A and 6B may be used in the system 300 of FIG. 3, or in other systems. The microfluidic device 600 may be used according to the methods described above, or according to other methods.

Similarly to the microfluidic device 100 of FIGS. 1 and 2, the microfluidic device 600 includes a substrate 602 that has a microfluidic channel 608, a study fluid inlet port 616 that is in fluid communication with the microfluidic channel 608 via a study fluid inlet channel 622, an isolation fluid inlet port 618 that is in fluid communication with the microfluidic channel 608, and an outlet port 620 that is in fluid communication with the microfluidic channel 608. However, referring also to FIG. 76B, the microfluidic channel 608 includes a microventuri section 624, which includes a pair of microventuries, to facilitate cavitation in the microfluidic channel 608.

In further examples, in order to further facilitate cavitation, a laser may be used to agitate the contents of the microfluidic channel.

Referring now to FIGS. 7A to 7C, an additional example of a microfluidic device is shown. Features in FIGS. 7A to 7C that are like those of FIGS. 1 and 2 will be referred to with like reference numerals as in FIGS. 1 and 2, incremented by 600. The microfluidic device 700 of FIGS. 7A and 7B may be used in the system 300 of FIG. 3, or in other systems. The microfluidic device 700 may be used according to the methods described above, or according to other methods.

Similarly to the microfluidic device 100 of FIGS. 1 and 2, the microfluidic device 700 includes a substrate 702 that has a microfluidic channel 708, a study fluid inlet port 716 that is in fluid communication with the microfluidic channel 708 via a study fluid inlet channel 722, an isolation fluid inlet port 718 that is in fluid communication with the microfluidic channel 708, and an outlet port 720 that is in fluid communication with the microfluidic channel 708.

As shown in FIG. 7A, the microfluidic device 700 further includes a bypass outlet port 724 that is in fluid communication with the study fluid inlet channel 722. Furthermore, as shown in FIG. 7B, the study fluid inlet channel 722 is in fluid communication with the microfluidic channel 708 via a microfluidic filter zone 726 and a feed channel 728. The microfluidic filter zone 726 includes a series of interconnected channels of relatively small cross-section (e.g. a depth of 50 microns and a width of 5 microns). If a relatively large particle in the study fluid were to plug one of the channels of the microfluidic filter zone 726, the study fluid could continue to flow through the remaining channels. By passing the study fluid through the microfluidic filter zone 726 prior to loading the study fluid into the microfluidic channel 708, plugging of the microfluidic channel 708 can be prevented, or the risk of plugging can be minimized or reduced.

Referring still to FIG. 7A, the isolation fluid inlet port 718 is in fluid communication with the outlet port 720 via an isolation fluid channel 730. Referring to FIGS. 7B and 7C, the isolation fluid channel 730 is further in fluid communication with the first end of the microfluidic channel 708 via a first set 732 of comb channels, and is in fluid communication with the second end of the microfluidic channel 708 via a second set 734 of comb channels. The comb channels are of relatively small cross section (e.g. a depth of 1 micron and a width of 5 microns) and oppose the flow of relatively high viscosity fluids, such as certain study fluids. In use, due to the flow opposition, the first set 732 of comb channels and the second set 734 of comb channels may allow for the microfluidic channel 708 to behave as a dead-end channel. This in turn can help to keep the first slug of study fluid stationary in the microfluidic channel 708.

Referring now to FIGS. 8A to 8C, an additional example of a microfluidic device is shown. Features in FIGS. 8A to 8C that are like those of FIGS. 7A to 7C will be referred to with like reference numerals as in FIGS. 7A to 7C, incremented by 100. The microfluidic device 800 of FIGS. 8A to 8C may be used in the system 300 of FIG. 3, or in other systems. The microfluidic device 800 may be used according to the methods described above, or according to other methods.

Similarly to the microfluidic device 700 of FIGS. 7A to 7C, the microfluidic device 800 includes a substrate 802 that has a microfluidic channel 808, a study fluid inlet port 816 that is in fluid communication with a bypass outlet port 824 via a study fluid inlet channel 822, a microfluidic filter zone 826 providing fluid communication between the study fluid inlet channel 822 and the microfluidic channel 808, an isolation fluid inlet port 818 that is in fluid communication with an outlet port 820 via an isolation fluid channel 830, a first set 832 of comb channels (described in further detail below), and a second set 834 of comb channels that provide fluid communication between the second end of the microfluidic channel 808 and the isolation fluid channel 830.

Referring to FIGS. 8B and 8C, in the microfluidic device 800, the first set 832 of comb channels provides fluid communication between the isolation fluid channel 830 and the study fluid inlet channel 822. This can allow for the study fluid and the isolation fluid to enter the microfluidic channel 808 from a common channel (e.g. the study fluid inlet channel 822), which can in turn allow for ease of operation, as during loading of the isolation fluid into the microfluidic channel 808, the pressure of the study fluid in the study fluid inlet channel 822 does not necessarily need to be independently controlled.

Furthermore, referring to FIG. 8B, in the microfluidic device 800, the filter zone 826 is in fluid communication with the microfluidic channel 808 via a pair of feed channels 828*a*, 828*b*, which are joined to the microfluidic channel 808 at spaced apart junctions. By using two feed channels 828*a*, 828*b*, slugs of study fluid and/or isolation fluid can be automatically generated. For example, if the microfluidic channel 808 was initially filled with study fluid, and then isolation fluid was loaded into the microfluidic device 800 via the isolation fluid inlet port 818, the isolation fluid channel 830, the first set 832 of comb channels, the study fluid inlet channel 822, the filter zone 826, and then the feed channels 828*a*, 828*b*, the isolation fluid would enter the microfluidic channel 808 at spaced apart junctions, thereby generating a slug of study fluid between the junctions. Similarly, there can be more than two feed channels for automatic generation of study fluid and/or isolation fluid slugs.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A microfluidic system comprising:

a microfluidic device comprising a microfluidic substrate, the microfluidic substrate comprising a microfluidic channel for isolating a slug of a study fluid within an isolation fluid, a study fluid inlet port in fluid communication with the microfluidic channel, an isolation fluid inlet port in fluid communication with the microfluidic channel, and an outlet port in fluid communication with the microfluidic channel, wherein the isolation fluid inlet port is in fluid communication with the outlet port via an isolation fluid channel, and the isolation fluid channel is further in fluid communication with a first end of the microfluidic channel via a first set of comb channels, and is in fluid communication with a second end of the microfluidic channel via a second set of comb channels;

a study fluid injection sub-system housing the study fluid and configured to force the study fluid into the microfluidic channel;

an isolation fluid injection sub-system housing the isolation fluid and configured to force the isolation fluid into the microfluidic channel;

a pressure regulation sub-system for regulating pressure in the microfluidic channel;

a manifold providing fluid communication between the microfluidic device and the study fluid injection sub-system, the isolation fluid injection sub-system, and the pressure regulation sub-system;

a temperature regulation sub-system for regulating a temperature within the microfluidic channel and the study fluid injection sub-system; and an optical investigation sub-system for optically accessing at least a portion of the microfluidic channel.

2. The microfluidic system of claim 1, wherein the microfluidic substrate further comprises a bypass outlet port that is in fluid communication with the study fluid inlet port via a study fluid inlet channel.

3. The microfluidic system of claim 1, wherein the study fluid injection sub-system is in fluid communication with the study fluid inlet port, the isolation fluid injection sub-system is in fluid communication with the isolation fluid injection port, and the pressure regulation sub-system comprises a backpressure regulator in fluid communication with the outlet port.

4. The microfluidic system of claim 1, wherein the isolation fluid is at least one of water, an ionic fluid, a fluorocarbon oil, and a liquid metal.

5. The microfluidic system of claim 1 further comprising a control sub-system connected to the study fluid injection sub-system, the isolation fluid injection sub-system, the pressure regulation sub-system, the temperature regulation sub-system, and the optical investigation sub-system, for providing automatic control of the microfluidic system.

* * * * *